United States Patent
Kogure et al.

(10) Patent No.: US 9,553,335 B2
(45) Date of Patent: *Jan. 24, 2017

(54) LEAD-ACID BATTERY

(75) Inventors: Koji Kogure, Tokyo (JP); Masatoshi Toduka, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 747 days.

This patent is subject to a terminal disclaimer.

(21) Appl. No.: 13/996,680

(22) PCT Filed: Dec. 21, 2010

(86) PCT No.: PCT/JP2010/072998
§ 371 (c)(1),
(2), (4) Date: Jun. 21, 2013

(87) PCT Pub. No.: WO2012/086008
PCT Pub. Date: Jun. 28, 2012

(65) Prior Publication Data
US 2013/0280595 A1    Oct. 24, 2013

(51) Int. Cl.
*H01M 4/13* (2010.01)
*H01M 4/60* (2006.01)
*H01M 4/58* (2010.01)
*H01M 10/06* (2006.01)
*H01M 2/16* (2006.01)
*H01M 4/04* (2006.01)
*H01M 4/20* (2006.01)
*H01M 4/56* (2006.01)
*H01M 4/68* (2006.01)
*H01M 4/62* (2006.01)
*H01M 10/42* (2006.01)
*H01M 10/14* (2006.01)
*H01M 4/02* (2006.01)

(52) U.S. Cl.
CPC .............. *H01M 10/06* (2013.01); *H01M 2/162* (2013.01); *H01M 2/1606* (2013.01); *H01M 2/1613* (2013.01); *H01M 4/0416* (2013.01); *H01M 4/20* (2013.01); *H01M 4/56* (2013.01); *H01M 4/62* (2013.01); *H01M 4/628* (2013.01); *H01M 4/685* (2013.01); *H01M 10/4235* (2013.01); *H01M 10/14* (2013.01); *H01M 2004/021* (2013.01); *Y02E 60/126* (2013.01); *Y02T 10/7016* (2013.01)

(58) Field of Classification Search
CPC ........ H01M 4/133; H01M 4/583; H01M 4/14; H01M 4/60; H01M 4/625
USPC ................................. 429/212, 213
See application file for complete search history.

(56) References Cited

U.S. PATENT DOCUMENTS

| | | | | |
|---|---|---|---|---|
| 5,547,783 A | * | 8/1996 | Funato | H01M 4/14 429/212 |
| 6,074,782 A | * | 6/2000 | Mizutani | H01M 4/14 429/215 |
| 6,548,211 B1 | * | 4/2003 | Kamada | H01M 4/14 429/225 |
| 9,160,002 B2 | * | 10/2015 | Shibahara | H01M 4/14 |
| 2002/0106557 A1 | * | 8/2002 | Fraser-Bell | H01M 2/1666 429/145 |
| 2006/0269801 A1 | * | 11/2006 | Honbo | H01M 2/0242 429/7 |

FOREIGN PATENT DOCUMENTS

| | | |
|---|---|---|
| CN | 102246343 A | 11/2011 |
| CN | 102265448 A | 11/2011 |
| CN | 102576911 A | 7/2012 |
| CN | 102893445 A | 1/2013 |
| JP | 63-24547 | 2/1988 |
| JP | 11-250913 | 9/1999 |
| JP | 2002-141066 | 5/2002 |
| JP | 2002-231247 | 8/2002 |
| JP | 2003-338284 | 11/2003 |
| JP | 2006-196191 | 7/2006 |
| JP | 2008-140645 | 6/2008 |
| WO | WO 2005/124920 A1 | 12/2005 |

OTHER PUBLICATIONS

Office Action in counterpart CN Appln.No. 201080002200.0 dated Jan. 22, 2016 in English.

* cited by examiner

*Primary Examiner* — Patrick Ryan
*Assistant Examiner* — Julian Anthony
(74) *Attorney, Agent, or Firm* — Fitch, Even, Tabin & Flannery LLP

(57) ABSTRACT

A lead-acid battery improving the charge acceptance in an initial stage, suppressing the decrease of the charge acceptance for a long time use of the battery and having a long life is provided. In a lead-acid battery using a paste type negative plate prepared by filling a past form negative active material using a lead powder as a starting material in a collector made of a lead alloy, a flake graphite and a condensate of bisphenols and aminobenzene sulfonic acid are contained in the negative active material. The average primary particle diameter of the flake graphite is 10 μm or more and 220 μm or less, preferably, 100 μm or more and 220 μm or less. The content of the flake graphite is preferably from 0.5 mass parts to 2.7 mass parts and, more preferably, from 1.1 mass parts to 2.2 mass parts based on 100 mass parts of the negative active material (spongy metallic lead) in a fully charged state.

13 Claims, 1 Drawing Sheet

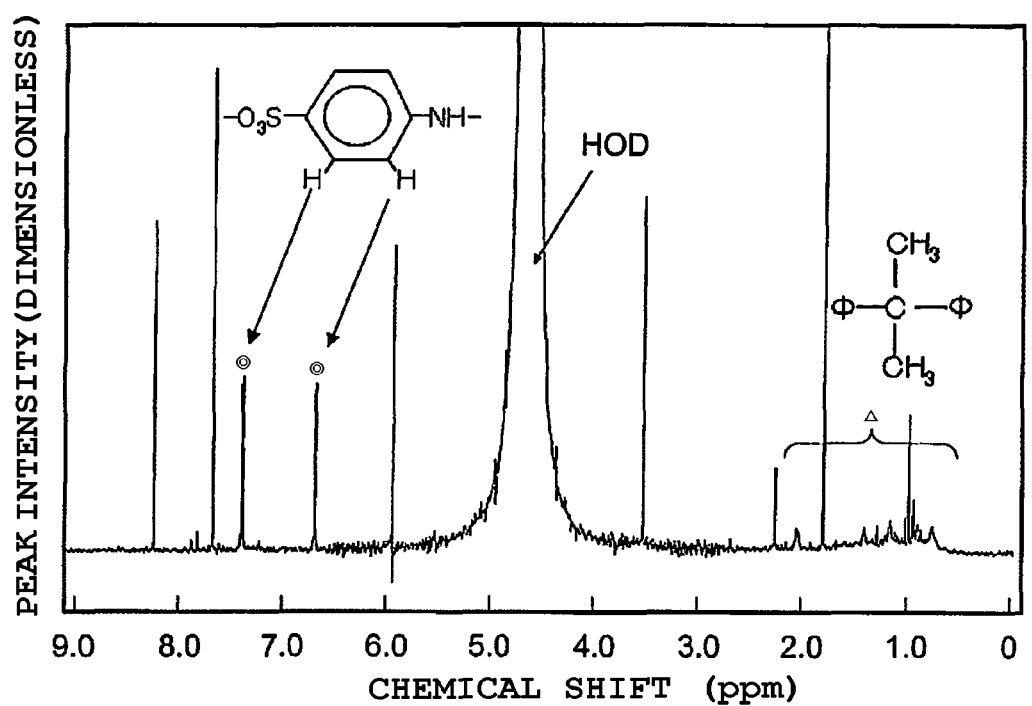

ID BATTERY

TECHNICAL FIELD

The present invention relates to a lead-acid battery.

BACKGROUND ART

Automotive lead-acid batteries have been used generally for starting engines and supplying power to electric components. In recent years, for environmental preservation and fuel cost improvement, idling stop and start of stopping an engine during temporary stopping of a vehicle and restarting the engine upon starting (hereinafter referred to as ISS) has been introduced. Since engine starting and stopping are repeated frequently in ISS, the number of high rate discharge cycles increases in batteries upon starring the engine, and discharge load is increased being coupled with the use of electric components. A Battery has been charged by constant voltage charging as usual by an alternator, and a setting value for the alternator voltage has been lowered in recent years with an aim of reducing the decrease of electrolyte due to electrolyzing water during charging. In addition to the low charge voltage, a system of "controlling charging by the alternator during running in accordance with the running state of a vehicle and a charged state of a battery thereby decreasing the engine load, improving the fuel cost, and decreasing $CO_2$", which is referred to as a power generation control system, has also been adopted in recent years. It can be said that such a system provides a circumstance where the battery is less charged and fully charged state is less obtained. Under such a working condition, the battery is not charged fully and often used in an over-discharged state.

When the battery is not charged fully and a poor charged state continues, this causes a phenomenon that lead sulfate as an inert discharging product is accumulated on plates (sulfation). It has been known that the active material is less reduced (less charged) and the battery performance is deteriorated under such a situation. Further, when the fully charged state is less obtainable, a stratification phenomenon occurs to cause difference in the concentration of a diluted sulfuric acid as an electrolyte between the upper portion and the lower portion of plates of the battery. In this case, the concentration of the diluted sulfuric acid increases in the lower portion of the plates and sulfation arises. Accordingly, the reactivity is lowered in the lower portion of the plates and reaction is concentrated only to the upper portion of the plates. As a result, degradation such as weakening of bonding between the active materials proceeds in which the active material is defoliated from grid in the upper portion of the plate to lower the battery performance and shorten the life. As described above, since recent batteries have been used in an poor charged state, it has been demanded for the improvement of charge acceptance.

As means for improving the charge acceptance of the battery, Patent documents 1 and 2 disclose a technique of adding an additive to a negative active material.

The Patent document 1 discloses a technique of simultaneously adding a synthetic lignin having a molecular weight of about 17,000 to 20,000 (condensate of bisphenols and amino benzene sulfonic acid) and a carbon black having a specific surface of 150 to 300 $m^2/g$ obtained from heavy oil as a starting material to a negative active material of a lead-acid battery in order to improve the charge acceptance.

The Patent document 2 discloses a technique, for obtaining a valve regulated lead-acid battery of a long life, of subjecting acetylene black or natural flake graphite to hydrogen reduction, preparing a paste type negative plate in which the reduced acetylene black or natural flake graphite is incorporated in an active material layer, and using the paste type negative plate.

RELATED ART DOCUMENT

Patent Documents

Patent Document 1: Japanese Patent Application Laid-Open Publication No. 2006-196191
Patent Document 2: Japanese Patent Application Laid-Open Publication No. 2002-231247

SUMMARY OF THE INVENTION

Subject to be Solved by the Invention

However, the technique described in the Patent Document 1 involves a problem in a cycle life test for evaluating the automotive lead-acid battery that the charge acceptance is decreased as the cycle proceeds. Further, the effect could not be confirmed also for the method described in the Patent Document 2 in the cycle life test described above.

It is an object of the present invention to provide a long life lead-acid battery by improving the charge acceptance in an initial stage and suppressing the decrease of the charge acceptance in a long time use of the battery.

Means for Solving the Subject

As primary aspects of the invention for addressing the subjects described above, a first aspect of the invention relates to a lead-acid battery of using a paste type negative plate prepared by filling a past form negative active material using a lead powder as a starting material to a collector made of a lead alloy, characterized in that a flake graphite and a condensate of bisphenols and aminobenzene sulfonic acid are contained in a negative active material, and the flake graphite has an average primary particle diameter of 100 μm or more and 220 μm or less. The condensate of bisphenols and aminobenzene sulfonic acid means a formaldehyde condensate of bisphenols and aminobenzene sulfonic acid.

A second aspect of the invention according to the first or second aspect of the invention is characterized in that the content of the flake graphite is from 0.5 mass parts to 2.7 mass parts based on 100 mass parts of the negative active material (spongy metallic lead) in a fully charged state.

In a third aspect of the invention, the content of the flake graphite is more preferably from 1.1 mass parts to 2.2 mass parts.

The average primary particle diameter of the flake graphite is determined according to a laser diffraction •scattering method described in Japanese Industrial Standards M 8511 (2005). Measurement is performed by using a laser diffraction•scattering particle size distribution analyzer (MICROTRACK 9220 FRA, manufactured by Nikkiso Co., Ltd.), charging a flake graphite specimen by an appropriate amount in an aqueous solution containing 0.5 vol. % of a commercial surfactant, polyoxyethylene octylphenyl ether (for example, Triton X-100, Roche Diagnostics GmbH) as a dispersant, and conducting measurement after irradiating ultrasonic waves at 40 W for 180 sec while storing. The obtained value of the average particle diameter (median diameter: D50) is defined as an average primary particle diameter.

The charge reaction of the negative active material is a reaction in which lead sulfate as a discharge product is dissolved, and dissolved lead ions form metallic lead under the effect of reduction. The charge acceptance depends on the concentration of the lead ions dissolved at the surface of the plate or in the plate, and the charge acceptance is improved as the amount of the lead ions to be formed is larger. In a case where the lead-acid battery undergoes repetitive charge/discharge in a working circumstance such as ISS, that is, in a poor charged state, this results in growing of lead sulfate and lowers the concentration of the lead ions dissolved from lead sulfate to extremely decrease the charge acceptance.

The flake graphite contained in the negative active material has an effect of suppressing the growing of lead sulfate formed in the course of discharge. Due to the effect, when the flake graphite is present in the negative active material, this can increase the surface area of lead sulfate particles to maintain a state where the lead ions can be dissolved easily, and decrease of the charge acceptance can be suppressed for a long time. The flake graphite means those described in Japanese Industrial Standards M 8601 (2005).

Further, the electric resistivity of the flake graphite is 0.02 Ω·cm or lower which is smaller by about one digit than that of carbon blacks such as acetylene black which is about 0.1 Ω·cm. Accordingly, by using the flake graphite in place of carbon blacks used so far in conventional lead-acid batteries, the electric resistance of the negative active material can be lowered to improve the charge acceptance.

For suppressing the growing of lead sulfate in the negative plate caused by repetitive charge/discharge, lignin or a sodium salt of lignin sulfonic acid obtained from lignin as a starting material has usually been added to the negative active material. However, since such additives adsorb lead ions dissolved from lead sulfate, the concentration of the lead ions which is to be increased by dissolution from lead sulfate is not increased and the additives impair the charge acceptance.

According to an aspect of the invention, since the condensate of bisphenols and aminobenzene sulfonic acid which is added instead of lignin or sodium salt of lignin sulfonic acid has less adsorption of lead ions than lignin or the sodium salt of lignin sulfonic acid used so far, it does not constrain the movement of lead ions dissolved from lead sulfate and can improve the charge acceptance.

In a fourth aspect of the invention, a formaldehyde condensate of bisphenol A and sodium aminobenzene sulfonate is selected as a condensate of biphenols and aminobenzene sulfonic acid.

Further, in a fifth aspect of the invention, a separator in which the surface of the separator opposed the surface of the negative plate, is comprised of a non-woven fabric formed of fibers including at least one material selected from the group of materials consisting of glass, pulp, and polyolefin is selected.

Sulfate ions formed from lead sulfate during charging move downward along the surface of the plate. When the battery is used continuously in a poor charged state, since the battery is not charged fully, an electrolyte is not stirred by gassing. As a result, this causes heterogeneity in the concentration of the electrolyte, which is referred to as stratification where the specific gravity of the electrode is higher in the lower portion of the battery and the specific gravity of the electrolyte is lower in the upper portion thereof. When such a phenomenon arises, since the reaction area is decreased, the charge acceptance and the discharge performance are decreased. When a separator of high porosity including a non-woven fabric is disposed in opposition to the surface of the negative plate, since downward movement of the sulfate ions can be prevented, rise of the stratification can be prevented and the charge acceptance can be improved further.

Effect of the Invention

According to an aspect of the invention, the charge acceptance in an initial stage can be improved, and decrease of the charge acceptance can be suppressed over a long time use of the battery.

BRIEF DESCRIPTION OF THE DRAWING

FIG. 1 is a chart showing spectra obtained by extracting a compound of chemical structural formula [chem. 1], which is added to a negative active material, from the negative plate after formation and measuring the same by NMR spectroscopy.

MODE FOR PRACTICING THE INVENTION

A mode for practicing the invention is to be described. However, the invention is not restricted to the following examples but can be practiced with optional modification so long as the gist thereof is not changed.

The lead-acid battery according to the invention is suitable for use in ISS or the like where discharge is conducted at a high rate in the poor charged state. In the embodiment of the invention, the lead-acid battery has a configuration in which a group of plates formed by stacking negative plates where a negative active material is filled in a negative collector and positive plates where a positive active material is filled in a positive collector each by way of a separator is contained together with an electrolyte inside a container. The basic configuration of them is identical with that of a conventional lead-acid battery.

As the separator, a usual polyethylene separator made of finely porous polyethylene sheet can be used. It is preferred to use a polyethylene separator not alone but as a combination of a separator formed of a non-woven fabric including one of materials of fibers such as glass fibers, polyolefin-based fibers, and pulp with the polyethylene separator. In this case, the separator made of superimposing the polyethylene separator and the separator including non-woven fabric, are used so that the surface of the separator formed of the non-woven fabric can oppose to the negative plate.

For the separator including the non-woven fabric described above, those including a mixture of multiple fibers selected from the fibers of the various kinds of materials described above (glass fiber, polyolefin-based fiber, pulp, etc.) may also be used. As the non-woven fabric including the mixture of such multiple fibers, those applicable to a valve regulated lead-acid battery as disclosed in, for example, Japanese Patent Application Laid-Open Publication No. 2002-260714 (not including glass fibers alone but including glass fibers and acid resistant organic resin fibers and, optionally, silica as a thin separator) can be used preferably. Further, the separator formed of the non-woven fabric may be used alone not in combination with the polyethylene separator made of the finely porous sheet.

Bisphenols in the condensate of bisphenols and aminobenzene sulfonic acid are bisphenol A, bisphenol F, bisphenol S, etc.

EXAMPLES

Example 1

(Preparation of Negative Plate)

As a condensate of bisphenols and aminobenzene sulfonic acid, a formaldehyde condensate of bisphenol A and sodium aminobenzene sulfonate represented by the following chemical structural formula [Chem. 1] (molecular weight: 15,000 to 20,000, sulfur content in the compound of 6 to 10 mass %) is used.

[Chem. 1]

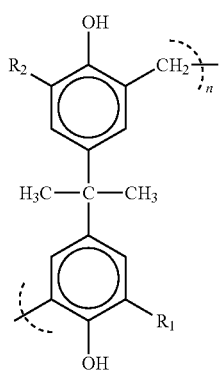

$R_1$ and $R_2$ represent each hydrogen or

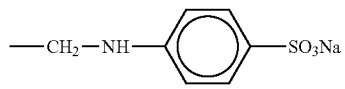

(excluding a case where both $R_1$ and $R_2$ are hydrogen)

To 100 mass parts of a starting lead powder including lead oxide as a main ingredient, 0.2 mass parts of a formaldehyde condensate of phenol A and sodium aminobenzene sulfonate, 1 mass part of a flake graphite having an average primary particle diameter of 180 μm, 1 mass part of barium sulfate, and 0.1 mass parts of cut fibers (polyester short fibers) were added and mixed and dispersed into the lead powder in a kneader.

Then, water and a diluted sulfuric acid (specific gravity: 1.26, converted at 20° C.) were dropped and kneaded to prepare a paste form negative active material having a water content of 12 mass % and a lead sulfate content of 13 mass %.

After filling 80 g of the negative active material in a grid form collector made of a lead-calcium based alloy, they were stood still and aged for 20 hours in a constant temperature bath at a temperature of 50° C. and at a humidity of 90%. Subsequently, they were dried at a temperature of 60° C. for 16 hours to prepare an unformed negative plate.

(Preparation of Positive Plate)

To 100 mass parts of a starting lead powder including lead oxide as the main ingredient, 0.1 mass parts of cut fibers (polyester short fibers) were added and mixed in a kneader. Then, water and a diluted sulfuric acid (specific gravity: 1.26, converted at 20° C.) were dropped and kneaded to prepare a paste form positive active material having a water content of 14 mass % and a lead sulfate content of 10 mass %.

After filling 110 g of the positive active material paste in a grid form collector made of a lead-calcium based alloy, they were stood still and aged for 22 hours in a constant temperature bath at a temperature of 50° C. and at a humidity of 95%. Then, they were dried at a temperature of 60° C. for 16 hours to prepare an unformed positive plate.

(Assembling of Battery and Formation)

The unformed negative plate was contained in a bursiform polyethylene separator made of a finely porous polyethylene sheet, seven pieces of the unformed negative plates and six pieces of the unformed positive plates were stacked alternately one by one, plate lugs on the side of the positive plate and on the side of the negative plate were welded respectively to form straps and prepare a group of plates.

The group of the plates was contained in each cell of a container made of polypropylene and partitioned into 6 cells, and a lid made of polypropylene formed with liquid pouring ports was fitted into and thermally welded to the container.

A diluted sulfuric acid (specific gravity: 1.24, converted at 20° C.) was poured by 700 ml per one cell from the liquid pouring port, a current was supplied at 30 A for 15 hours and formation in the container was conducted in a water bath at a temperature of 25° C. After the formation, the electrolyte was conditioned to 1.28 of specific gravity (converted at 20° C.), to manufacture a 75D23 type battery according to JIS-D 5301.

In Example 1, the content of the flake graphite blended as described above was 1.1 mass parts based on 100 mass parts of the negative active material (spongy metallic lead) in a fully charged state.

Examples 2 to 7, Comparative Example 1

Procedures were performed in the same manner as in Example 1 except for changing the average primary particle diameter of the flake graphite to be blended as 5, 10, 60, 90, 100, 140, and 220 μm, respectively.

When the average primary particle diameter of the flake graphite is greater than 220 μm, although an effect for the charge acceptance is obtained, bonding between the collector and the negative active material becomes weak and the negative active material tends to be defoliated from the collector. Accordingly, it is preferred in view of the practical use to use the flake graphite having an average primary particle diameter of 220 μm or less.

Comparative Examples 2 to 8

In each of the Examples 1 to 7 described above, 0.2 mass parts of sodium lignin sulfonate represented by the following chemical structural formula [chem. 2] (showing partial structure) was blended as lignin instead of the formaldehyde condensate of bisphenol A and sodium aminobenzene sulfonate. 75D23 type batteries were manufactured in the same manner as in each of the Examples 1 to 7 except for the change described above.

[Chem. 2]

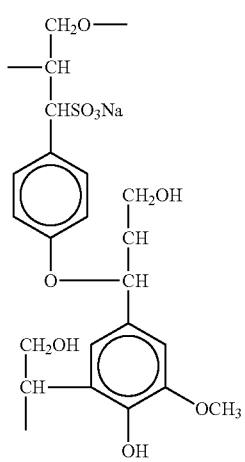

Existent Examples 1 to 3

A carbon black prepared from a heavy oil as a starting material (specific surface area: 260 m²/g) was blended by the following amount instead of the flake graphite in Example 1. That is, to 100 mass parts of the starting lead powder including lead oxide as the main ingredient, the carbon black was blended by 0.3 mass parts in Existent Example 1, 0.5 mass parts in Existent Example 2, and 1 mass part in Existent Example 3, and 75D23 type batteries were manufactured in the same manner as in Example 1 except for the change described above.

Examples 8 to 14

In Example 1, the flake graphite was blended by the following amounts while changing the blending amount thereof. That is, to 100 mass parts of the starting lead powder including lead oxide as a main ingredient, the flake graphite was blended by 0.2 mass parts in Example 8, 0.4 mass parts in Example 9, 0.5 mass parts in Example 10, 1.5 mass parts in example 11, 2 mass parts in Example 12, 2.5 mass parts in Example 13, and 3 mass parts in Example 14, and 75D23 type batteries were manufactured in the same manner as in Example 1 except for the change described above.

The content of the blended flake graphite in Examples 8 to 14 was 0.2 mass parts, 0.4 mass parts, 0.5 mass parts, 1.6 mass parts, 2.2 mass parts, 2.7 mass parts, and 3.2 mass parts, respectively based on 100 mass parts of the negative active material (spongy metallic lead) in a fully charged state.

Examples 15 to 22

In each of Example 1 and Examples 8 to 14, the polyethylene separator in which of the surface opposed to the surface of the negative plate was comprised of a non-woven fabric made of glass fibers, was disposed. In the same manner as in each of Example 1 and Examples 8 to 14, 75D23 type batteries were manufactured except for the change described above.

(Charge Acceptance Test)

The charge acceptance of the lead-acid battery in each of the examples, the comparative examples, and the existent examples described above was evaluated.

The state of charge of the battery was represented by SOC (State Of Charge), and the fully charged state is defined as SOC 100% and the fully discharged state in a capacity test (5 hour rate discharge test according to Japanese Industrial Standards 5301) is defined as SOC 0%. For the charge acceptance test, a battery at SOC 90%, that is, discharged from the fully charged state by 10% discharge for a 5 hour rate discharge capacity was provided, which was charged at a charging voltage of 14.0 V (limit current at 100 A) at an environmental temperature of 25° C., and a current value at 5 seconds from starting discharge was measured. A larger current value shows an index of better charge acceptance of the battery.

The lead-acid battery in each of the examples, the comparative examples, and the existent examples was subjected to a shallow cycle endurance test according to Japanese Industrial Standards D 5301 shown below.

The test was performed as described below. That is, a battery in a fully charged state is placed in a constant temperature bath and stood still the temperature of the battery reaches 40° C. Successively, a charge/discharge tester and the battery are wired and subjected to (i) discharge: constant current discharge at a discharging current of 25 A for 4 minutes and (ii) charge: constant voltage charge for 10 minutes at a charging voltage of 14.8 V (limit current at 25 A). Charge/discharge are continued while assuming (i) and (ii) as one cycle.

Then, the charge acceptance was evaluated at the first cycle and at the 3800th cycle of the shallow cycle endurance test. The 3800th cycle in the test corresponds to the life judging level specified in Japanese Industrial Standards. In this embodiment, this was used as an index for the evaluation of the performance.

(Characteristic of Electrolyte Decrease)

Batteries of Example 1 and Examples 8 to 14 were subjected to a test according to Japanese Industrial Standards D5301 shown below. That is, a battery in a fully charged state was placed in a water bath at 40° C. and subjected to constant voltage charge at a charging voltage of 14.4V for 500 hours continuously. The amount of electrolyte decrease was determined based on the formula represented by the following (equation 1) assuming the battery mass before charging as Ni, the battery mass after charging as W2, and reserve capacity capacitance as Cr.e.

The battery with less amount of electrolyte decrease has an electrolyte decrease amount of 4 g/Ah or less as determined based on (equation 1).

$$(W1-W2)/1.2429 Cr.e^{0.8455} \text{ (g/Ah)} \qquad \text{(Equation 1)}$$

The results of each of the evaluations are shown in Table 1 and Table 2.

Table 1 shows the result of evaluation for the charge acceptance at the first cycle (initial stage) and at the 3800th cycle in the shallow cycle endurance test while changing the primary particle diameter of the flake graphite, together with the blended mass parts of each of the materials (based on 100 mass parts of the starting lead powder) upon preparation of the negative active material and the primary particle diameter of the flake graphite.

Further, Table 2 shows the result of evaluation for the charge acceptance at the first cycle (initial stage) and at the 3800th cycle in the shallow cycle endurance test while changing the blending amount of the flake graphite at an average primary particle diameter of 180 μm, together with the mass part content of each of the materials based on 100 mass parts of the negative active material (spongy metallic lead) in the fully charged state.

In view of Table 1, the followings can be recognized.

Since the formaldehyde condensate of bisphenol A and sodium aminobenzene sulfonate and the flake graphite having an average primary particle diameter of 10 μm or more are blended in combination, the charge acceptance at the first cycle (initial stage) and at the 3800th cycle in the shallow cycle endurance test is excellent and the charge acceptance can be maintained for a long time from the initial stage of using the battery. The effect of maintaining the charge acceptance for the long time becomes more remarkable the concentration of the lead ions that is to be increased by dissolution from the lead sulfate is not increased to impede the charge acceptance.

TABLE 1

| | Negative blend material (based on 100 mass parts of starting lead powder) | | | | | |
|---|---|---|---|---|---|---|
| | | | Carbonaceous material | | | |
| | | | flake graphite | | | |
| | Organic material | | Average primary | Carbon black | Charge acceptance | |
| | | Blended mass parts | particle diameter (μm) | Blended mass parts | Blended mass parts | First cycle (A) | 3800th cycle (A) |
| Comp. Example 1 | Formaldehyde condensate | 0.2 | 5 | 1 | | 90 | 42 |
| Example 2 | of bisphenol | | 10 | | | 92 | 45 |
| Example 3 | A and sodium | | 60 | | | 92 | 53 |
| Example 4 | aminobenzene | | 90 | | | 92 | 55 |
| Example 5 | sulfonate | | 100 | | | 92 | 60 |
| Example 6 | | | 140 | | | 90 | 60 |
| Example 1 | | | 180 | | | 90 | 65 |
| Example 7 | | | 220 | | | 90 | 65 |
| Comp. Example 2 | Sodium lignin | | 10 | | | 55 | 30 |
| Comp. Example 3 | sulfonate | | 60 | | | 55 | 30 |
| Comp. Example 4 | | | 90 | | | 55 | 35 |
| Comp. Example 5 | | | 100 | | | 58 | 35 |
| Comp. Example 6 | | | 140 | | | 59 | 35 |
| Comp. Example 7 | | | 180 | | | 60 | 35 |
| Comp. Example 8 | | | 220 | | | 60 | 35 |
| Extent Example 1 | Formaldehyde condensate | | | | 0.3 | 90 | 40 |
| Extent Example 2 | of bisphenol A and sodium | | | | 0.5 | 72 | 42 |
| Extent Example 3 | aminobenzene sulfonate | | | | 1 | 62 | 44 | when the average primary particle diameter of the flake graphite is 100 μm or more (Examples 5 to 7).

The charge acceptance in each of the examples and each of the comparative examples is judged for the superiority or inferiority in comparison with that of the existent examples.

When the average primary particle diameter of the flake graphite is less than 10 μm (Comparative Example 1), the charge acceptance at the 3800th cycle is decreased and the charge acceptance cannot be maintained for a long time. It is necessary to ensure the charge acceptance by forming a conductive network between lead sulfate particles as non-conductors formed in the negative active material during discharge.

However, when the particle diameter of the flake graphite is small, it is supposed that the conductive network with the flake graphite is not formed sufficiently and the effect of blending the flake graphite is not developed.

Further, as shown in Comparative Examples 2 to 7, even in a case of blending the flake graphite having an average primary particle diameter of 10 μm or more, the charge acceptance at the first cycle and at the 3800th cycle cannot be improved unless this is combined with the formaldehyde condensate of bisphenol A and sodium aminobenzene sulfonate. This is because the sodium lignin sulfonate adsorbs the lead ions dissolved from lead sulfate and, accordingly, In view of Table 2, the followings can be recognized.

Since the content of the flake graphite is 0.5 mass parts to 2.7 mass parts based on 100 mass parts of the negative active material (spongy metallic lead) in the fully charged state (Example 1, Examples 10 to 13), the charge acceptance can be maintained in a favorable state both at the first cycle (initial stage) and at the 3800th cycle of the shallow cycle endurance test, and decrease of electrolyte can also be suppressed. The effect becomes further remarkable by defining the content of the flake graphite as 1.1 mass parts to 2.2 mass parts (Example 1, Examples 11, 12).

It is supposed that as the content of the flake graphite is increased, impurities in the flake graphite lower a hydrogen over-voltage to accelerate the electrolyte decrease. Further, when the content of the flake graphite is increased, the bonding strength between the collector and the negative active material is lowered and the active material tends to be defoliated from the plate, to result in other factor of shortening the battery life. Then it is preferred that the content of the flake graphite is from 0.5 mass parts to 2.7 mass parts based on 100 mass parts of the negative active material (spongy metallic lead) in the fully charged state.

TABLE 2

| | Negative contained material (based on 100 mass parts of fully charged negative active material) | | | | | | Electrolyte decrease characteristic |
|---|---|---|---|---|---|---|---|
| | Organic material | | Carbonaceous material Flaky graphite | | Charge acceptance | | |
| | Type | Blended mass parts | Average primary particle diameter (μm) | Blended mass parts | First cycle (A) | 3800th cycle (A) | Electrolyte decrease amount (g/Ah) |
| Example 8 | Formaldehyde condensate of bisphenol A and sodium aminobenzene sulfonate | 0.2 | 180 | 0.2 | 92 | 43 | 0.3 |
| Example 9 | | | | 0.4 | 92 | 45 | 0.5 |
| Example 10 | | | | 0.5 | 90 | 60 | 0.8 |
| Example 1 | | | | 1.1 | 90 | 65 | 1.5 |
| Example 11 | | | | 1.6 | 90 | 65 | 2.3 |
| Example 12 | | | | 2.2 | 90 | 65 | 2.8 |
| Example 13 | | | | 2.7 | 90 | 65 | 3.4 |
| Example 14 | | | | 3.2 | 85 | 70 | 4.2 |

In view of Table 3, the followings can be recognized.

When compared with Table 2 where only the constitution of the separator is made different, since the stratification of the electrolyte is suppressed by disposing the non-woven fabric to the surface opposed to the negative plate, the charge acceptance becomes further remarkable.

TABLE 3

| | Negative contained material (based on 100 mass parts of fully charged negative active material) | | | | | | Electrolyte decrease characteristic |
|---|---|---|---|---|---|---|---|
| | Organic material | | Carbonaceous material Flake graphite | | Charge acceptance | | |
| | Type | Blended mass parts | Average primary particle diameter (μm) | Blended mass parts | First cycle (A) | 3800th cycle (A) | Electrolyte decrease Amount (g/Ah) |
| Example 15 | Formaldehyde condensate of bisphenol A and sodium aminobenzene sulfonate | 0.2 | 180 | 0.2 | 92 | 48 | 0.3 |
| Example 16 | | | | 0.4 | 92 | 50 | 0.5 |
| Example 17 | | | | 0.5 | 90 | 64 | 0.8 |
| Example 18 | | | | 1.1 | 90 | 67 | 1.5 |
| Example 19 | | | | 1.6 | 90 | 67 | 2.3 |
| Example 20 | | | | 2.2 | 90 | 67 | 2.8 |
| Example 21 | | | | 2.7 | 90 | 67 | 3.4 |
| Example 22 | | | | 3.2 | 85 | 72 | 4.2 |

In condensates of bisphenols and aminobenzene sulfonic acid, bisphenol A shows a particularly high effect as bisphenols. Further, while the condensates having a basic structural unit where a p-aminobenzene sulfonic acid group is bonded to a benzene ring of bisphenols show a particularly high effect, an identical effect can be obtained also with the condensates where the sulfonic acid group is bonded to the benzene ring of the bisphenols.

(Analysis of Negative Active Material)

For confirming the presence of the formaldehyde condensate of bisphenol A and sodium benzene sulfonate in the negative active material, analysis was performed by Nuclear Magnetic Resonance (hereinafter referred to as NMR) spectroscopy. For the analysis, a nuclear magnetic resonance spectroscope manufactured by Nippon Denshi Co. (model: ECA-500FT-NMR) was used.

At first, the battery of Example 1 after formation was disassembled, the negative plate was taken out, and was washed with water to flush away a sulfuric acid component. Since the negative plate is porous spongy metallic lead, it was dried sufficiently in an inert gas such as nitrogen for preventing oxidation. Successively, the negative active material was sampled from the negative plate and was pulverized. A 10 mass % sodium hydroxide solution was added to 10 g of the pulverized specimen and the lead hydroxide was formed and precipitated while heating on a hot plate at about 100° C. The clear supernatant water was sampled, the water was evaporated on the hot plate, and the residual dross was obtained. The soluble components of the residual dross to heavy water were measured by the apparatus described above. The measuring conditions are shown in Table 4.

TABLE 4

| Measuring condition | Measured nuclei species | $^1$H |
|---|---|---|
| | Magnetic field strength | 11.747T (500 MHz at $^1$H nuclei) |
| | Measurement range | −3 ppm to 15 ppm |
| | Number of data | 16384 point |
| | Measuring mode | Non decoupling method |
| | Pulse waiting time | 7 sec |
| | Number of cycles of accumulation | 128 cycles |
| | Solvent for measurement | Heavy water |
| | Temperature at measurement | Room temperature |

FIG. 1 shows spectra measured by NMR spectroscopy. The spectral intensity (dimensionless) is expressed on the ordinate and the chemical shift is expressed on the abscissa (ppm).

Peaks attributable to the p-amino benzene sulfonic acid group in the formaldehyde condensate of bisphenol A and sodium aminobenzene sulfonate shown in chemical structural formula [chem. 1] were observed as indicated by double circles at the chemical shifts of 6.7 ppm and 7.5 ppm in the chart.

Further, in the region of the chemical shifts from 0.5 ppm to 2.5 ppm, peaks attributable to the bisphenol A skeleton in the formaldehyde condensate of bisphenol A and sodium aminobenzene sulfonate shown by chemical structural formula [chem. 1] were observed as indicated by triangles in the chart.

In view of the result of measurement by NMR spectroscopy, it could be confirmed that the formaldehyde condensate of bisphenol A and sodium aminobenzene sulfonate shown by chemical structural formula [chem. 1] was present in the negative active material.

The invention claimed is:

1. A lead-acid battery having a configuration in which a group of plates formed by stacking negative plates where a negative active material is filled in a negative collector and positive plates where a positive active material is filled in a positive collector by way of a separator is contained together with an electrolyte in a container, wherein
the negative active material contains a flake graphite and a condensate of bisphenols and aminobenzene sulfonic acid in the negative active material, and
the average primary particle diameter of the flake graphite is 100 μm or more and 220 μm or less.

2. The lead-acid battery according to claim 1, wherein the negative active material further contains spongy metallic lead, and the content of the flake graphite in the negative active material is from 0.5 mass % to 2.7 mass % of the flake graphite based on 100 mass parts of the spongy metallic lead in the negative active material in a fully charged state.

3. The lead-acid battery according to claim 1, wherein the negative active material further contains spongy metallic lead, and the content of the flake graphite in the negative active material is from 1.1 mass % to 2.2 mass % of the flake graphite based on 100 mass parts of the spongy metallic lead in the negative active material in a fully charged state.

4. The lead-acid battery according to claim 1, wherein the condensate of the bisphenols and aminobenzene sulfonic acid is a formaldehyde condensate of bisphenol A and sodium aminobenzene sulfonate represented by the following chemical structural formula [chem. 1]

[Chem. 1]

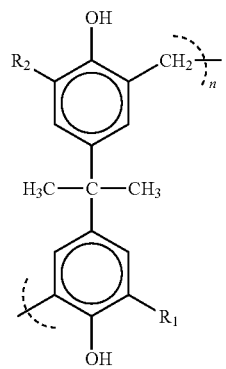

$R_1$ and $R_2$ represent each hydrogen or

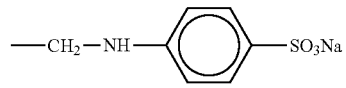

(excluding a case where both $R_1$ and $R_2$ are hydrogen).

5. The lead-acid battery according to claim 1, wherein the separator is formed of a non-woven fabric comprising at least one fiber material selected from the group of materials consisting of glass, pulp, and polyolefin.

6. The lead-acid battery according to claim 1, wherein the surface of the separator opposed to the surface of the negative plate is formed of a non-woven fabric comprising at least one fiber material selected from the group of materials consisting of glass, pulp and polyolefin, and the surface thereof opposed to the surface of the positive plate is formed of a porous polyethylene sheet.

7. The lead-acid battery according to claim 1, wherein the average primary particle diameter of the flake graphite is 140 μm or more and 220 μm or less.

8. A lead-acid battery having a configuration in which a group of plates formed by stacking negative plates where a negative active material is filled in a negative collector and positive plates where a positive active material is filled in a positive collector by way of a separator is contained together with an electrolyte in a container, wherein
the negative active material contains spongy metallic lead, a flake graphite, and a condensate of bisphenols and aminobenzene sulfonic acid in the negative active material,
the average primary particle diameter of the flake graphite is 100 μm or more and 220 μm or less, and the content of the flake graphite in the negative active material is from 0.5 mass % to 2.2 mass % of the flake graphite based on 100 mass parts of the spongy metallic lead in the negative active material in a fully charged state.

9. The lead-acid battery according to claim 8, wherein the condensate of the bisphenols and aminobenzene sulfonic acid is a formaldehyde condensate of bisphenol A and sodium aminobenzene sulfonate represented by the following chemical structural formula [chem. 1]

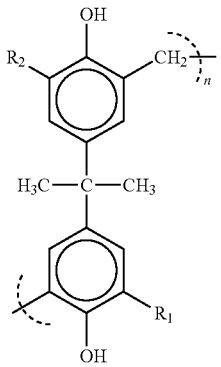

$R_1$ and $R_2$ represent each hydrogen or

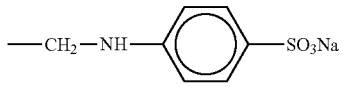

(excluding a case where both $R_1$ and $R_2$ are hydrogen).

10. The lead-acid battery according to claim 9, wherein the surface of the separator opposed to the surface of the negative plate is formed of a non-woven fabric comprising at least one fiber material selected from the group of materials consisting of glass, pulp, and polyolefin.

11. The lead-acid battery according to claim 8, wherein the average primary particle diameter of the flake graphite is 140 μm or more and 220 μm or less.

12. A lead-acid battery comprising:
negative plates including negative collectors filled with a negative active material;
positive plates including positive collectors filled with a positive active material, wherein the negative plates are alternately stacked with the positive plates;
separators between the negative plates and the positive plates;
an electrolyte; and
a container holding the negative plates, the positive plates, and the electrolyte,
wherein the negative active material contains a flake graphite and a condensate of bisphenols and aminobenzene sulfonic acid, and the average primary particle diameter of the flake graphite is 100 μm or more and 220 μm or less.

13. The lead-acid battery according to claim 12, wherein the average primary particle diameter of the flake graphite is 140 μm or more and 220 μm or less.

* * * * *